United States Patent
Legranger et al.

(10) Patent No.: US 10,574,102 B2
(45) Date of Patent: Feb. 25, 2020

(54) ROTARY ELECTRICAL MACHINE WITH CONFIGURATION MINIMIZING TORQUE UNDULATIONS

(71) Applicant: Valeo Equipements Electriques Moteur, Creteil (FR)

(72) Inventors: Jérome Legranger, Creteil (FR); Khadija El Baraka, Serris (FR); Svetislav Jugovic, Athis-Mons (FR)

(73) Assignee: Valeo Equipments Electriques Moteur, Creteil (FR)

( * ) Notice: Subject to any disclaimer, the term of this patent is extended or adjusted under 35 U.S.C. 154(b) by 234 days.

(21) Appl. No.: 15/468,528

(22) Filed: Mar. 24, 2017

(65) Prior Publication Data
US 2017/0279320 A1    Sep. 28, 2017

(30) Foreign Application Priority Data

Mar. 25, 2016 (FR) ...................................... 16 52591

(51) Int. Cl.
| H02K 1/27 | (2006.01) |
| H02K 1/14 | (2006.01) |
| H02K 3/18 | (2006.01) |

(52) U.S. Cl.
CPC ........... *H02K 1/2706* (2013.01); *H02K 1/146* (2013.01); *H02K 3/18* (2013.01); *H02K 2213/03* (2013.01)

(58) Field of Classification Search
CPC .... H02K 1/2706; H02K 1/2773; H02K 1/146; H02K 3/28; H02K 2201/03; H02K 2213/03

USPC ........................................................ 310/51
See application file for complete search history.

(56) References Cited

U.S. PATENT DOCUMENTS

| 8,564,166 B2 | 10/2013 | Pan | |
| 2008/0030093 A1 | 2/2008 | Maeda et al. | |
| 2010/0253171 A1* | 10/2010 | El-Refaie | H02K 1/2773 310/156.53 |
| 2010/0289370 A1 | 11/2010 | Roth et al. | |
| 2011/0043070 A1 | 2/2011 | Evans et al. | |
| 2014/0333168 A1* | 11/2014 | Bouarroudj | H02K 1/2773 310/156.56 |
| 2015/0108868 A1* | 4/2015 | Reddy | H02K 1/27 310/156.48 |

(Continued)

FOREIGN PATENT DOCUMENTS

| CN | 101119041 A | 2/2008 |
| CN | 102931795 A | 2/2013 |

(Continued)

*Primary Examiner* — Michael Andrews
(74) *Attorney, Agent, or Firm* — Berenato & White, LLC

(57) ABSTRACT

A rotary electrical machine comprises a stator and a rotor having an axis of rotation, wherein, on a plane radial to the axis of rotation has a rotor tooth with an arc of a circle. The arc is defined by a centre situated on the axis of symmetry of the tooth, a first point at an intersection between the axis of symmetry and a circle centred on the axis of rotation, and an outer radius. A second point is situated on an axis which passes via the axis of rotation, and forms an angle of 360° divided by a number equal to twice the number of magnetic poles. The second point is situated from the axis of rotation an amount equal to the outer radius decreased by an allowance. A ratio between the allowance and the outer radius is between 0.015 and 0.07.

16 Claims, 4 Drawing Sheets

(56) References Cited

U.S. PATENT DOCUMENTS

2015/0162791 A1    6/2015  Woo
2015/0318746 A1   11/2015  Miyajima
2016/0172949 A1*  6/2016  Matsuoka .............. H02K 21/16
                                                          310/195

FOREIGN PATENT DOCUMENTS

| CN | 104702009 A | 6/2015 |
|---|---|---|
| CN | 105048667 A | 11/2015 |
| CN | 204906033 U | 12/2015 |
| DE | 102014002100 A1 | 8/2014 |
| EP | 2863518 A2 | 4/2015 |
| EP | 2892128 A2 | 7/2015 |

* cited by examiner

ROTARY ELECTRICAL MACHINE WITH CONFIGURATION MINIMIZING TORQUE UNDULATIONS

CROSS-REFERENCE TO RELATED APPLICATIONS AND CLAIM TO PRIORITY

This application is related to Patent Application No. 1652591 filed Mar. 25, 2016 in France, the disclosure of which is incorporated herein by reference and to which priority is claimed.

FIELD OF THE INVENTION

The invention relates to a rotary electrical machine with a configuration which minimises torque undulations. The invention has a particularly advantageous, but not exclusive application with high-power reversible electrical machines which can function in alternator mode and in motor mode.

BACKGROUND OF THE INVENTION

In a known manner, rotary electrical machines comprise a stator and a rotor which is integral with a shaft. The rotor can be integral with a drive shaft and/or a driven shaft, and can belong to a rotary electrical machine in the form of an alternator, an electric motor or a reversible machine which can function in both modes.

The stator is fitted in a housing which is configured to rotate the shaft, for example by means of bearings. The stator comprises a body provided with a plurality of teeth which define notches, and a winding which is inserted in the notches of the stator. The winding is obtained for example from continuous wires covered with enamel, or from conductive elements in the form of pins connected to one another by welding. Alternatively, the phases of the machine are formed from individual coils which are each wound around a stator tooth. The phases connected in the form of a star or a triangle comprise outputs which are connected to an electric control module.

In addition, the rotor comprises a body formed by a stack of sheets of plates held together in the form of a set by means of a suitable securing system. The rotor comprises poles which are formed for example by permanent magnets accommodated in cavities, each delimited by two adjacent rotor teeth.

Variation of the torque supplied is observed around the average torque of the machine. This variation of torque is caused by the interaction between the rotor and the stator, and depends in particular on the magnetic saturation of the machine. This variation of torque gives rise to problems of noise, in particular when the electrical machine is coupled to an external element by means of a gear.

SUMMARY OF THE INVENTION

The objective of the invention is to eliminate this disadvantage by proposing a rotary electrical machine, in particular for a motor vehicle, comprising:
- a stator comprising a stator body provided with a plurality of stator teeth defining a plurality of notches, and a stator winding inserted in the said notches;
- a rotor having an axis of rotation and comprising a plurality of rotor teeth defining cavities in which permanent magnets are accommodated, the said rotor comprising a set of magnetic poles, characterised in that the said rotor is contained in a cylinder of revolution with an outer radius, each rotor tooth comprising:
  - an axis of symmetry which passes via the axis of rotation of the said rotor;
  - an outer face opposite an inner periphery of the said stator, on a plane which is radial relative to the axis of rotation;
  - the said outer face having curvature in the form of an arc of a circle, the arc of a circle being defined by:
    - a centre which is situated on the said axis of symmetry;
    - a first point which is situated at an intersection between the said axis of symmetry and a circle centred on the said axis of rotation, and a radius of which is the said outer radius; and
    - a second point which is situated on an axis which passes via the said axis of rotation of the rotor, and forms and angle of 360° divided by a number equal to twice the number of magnetic poles relative to the said axis of symmetry;
  - the said second point being situated at a distance from the said axis of rotation of the rotor which is equal to the outer radius decreased by an allowance; and
  - a ratio between the said allowance and the said outer radius is between 0.015 and 0.07.

The definition of a ratio of this type makes it possible to obtain an optimum compromise between the torque supplied by the machine and the corresponding level of torque undulation. The invention thus makes it possible to improve the magnetic and acoustic performance of the rotary electrical machine.

According to one embodiment, the said rotary electrical machine comprises a number of notches per pole and per phase equal to 0.5.

According to one embodiment, the said stator comprises a stator tooth pitch equal to 360° divided by the number of stator teeth, and on a plane which is radial relative to the axis of rotation of the rotor, a rotor tooth opening is equal to an angle between two straight lines each passing via the axis of rotation and an ortho-radial end of the outer face, and a ratio of the rotor tooth opening in degrees divided by the said stator tooth pitch in degrees is between 0.8 and 1.2.

The definition of a ratio of this type makes it possible to obtain an optimum compromise between the torque supplied by the machine and the corresponding level of torque undulation.

According to one embodiment, a ratio between an inner diameter of the said stator expressed in mm and a number of pairs of rotor poles is between 12 and 22, in particular between 13 and 21, for example between 14 and 20.

The definition of a ratio of this type makes it possible to obtain an optimum compromise between the torque supplied by the machine and the corresponding level of torque undulation.

According to one embodiment, the stator is provided with tooth roots on the free end side of the stator teeth, each tooth root extending circumferentially on both sides of a corresponding stator tooth.

According to one embodiment, each tooth root extends circumferentially according to an arc of a circle centred on the axis of rotation of the rotor.

According to one embodiment, the rotor comprises a body formed by an axial stack of magnetic plates.

According to one embodiment, the rotor body comprises a central core.

According to one embodiment, on a plane orthogonal to the axis of rotation of the rotor, each rotor tooth comprises a first portion globally with a constant width, obtained from the central core, extended by a second portion which widens in the direction opposite the axis X, and ends in a retention lip.

Unexpectedly, this particular configuration of the machine, in combination with at least one of the preceding ratios, makes it possible to reduce further the torque undulation.

According to one embodiment, the said stator winding is formed by a set of coils each wound around a stator tooth.

According to one embodiment, the said rotor is fitted on a shaft.

According to one embodiment, the said stator body and the said rotor are each formed by a set of plates.

According to one embodiment, a number of pairs of poles is equal to five.

According to one embodiment, a number of pairs of poles is equal to six.

According to one embodiment, an inner diameter of the said stator body is between 60 mm and 115 mm.

According to one embodiment, an inner diameter of the said stator body is between 70 mm and 100 mm.

According to one embodiment, an outer diameter of the said stator body is between 100 mm and 150 mm.

According to one embodiment, the said outer radius of the said cylinder of revolution in which the said rotor is contained is substantially equal to 34 mm.

According to one embodiment, a rotor tooth opening is approximately 24°.

According to one embodiment, a stator tooth opening is approximately 20°.

According to one embodiment, the said permanent magnets each have a bevelled end situated on the side of the said axis of rotation.

According to one embodiment, the rotor is of the flux concentration type.

BRIEF DESCRIPTION OF THE DRAWINGS

The invention will be better understood by reading the following description and examining the figures which accompany it. These figures are provided purely by way of illustration, but in no way limit the invention.

Elements which are identical, similar or analogous retain the same reference from one figure to another.

DETAILED DESCRIPTION OF THE PREFERRED EMBODIMENT(S)

Figure 1:
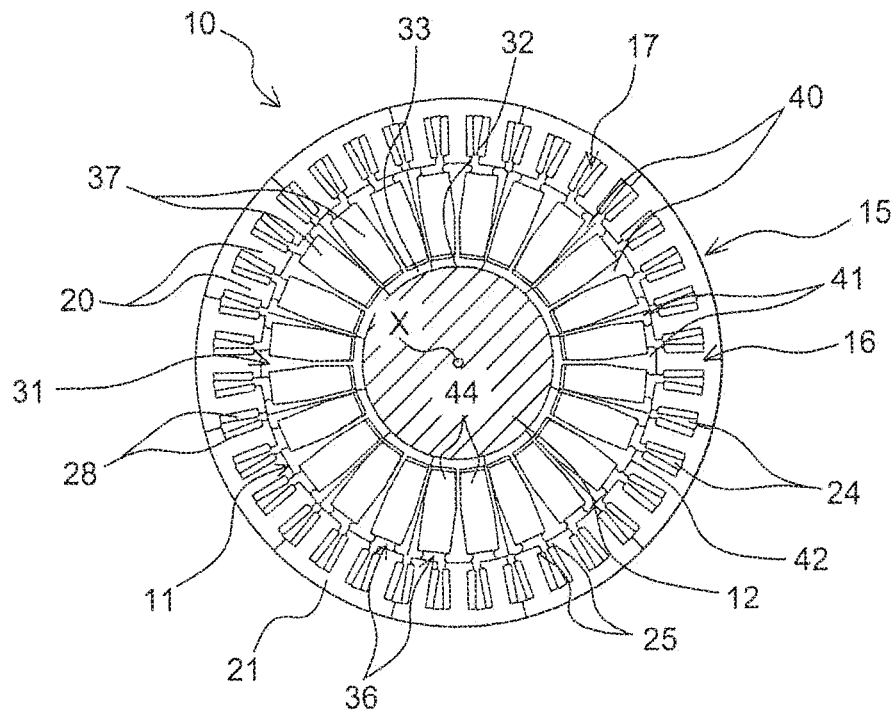
FIG. 1 shows a view in transverse cross-section of the rotary electrical machine according to the present invention.
Figure 2A:
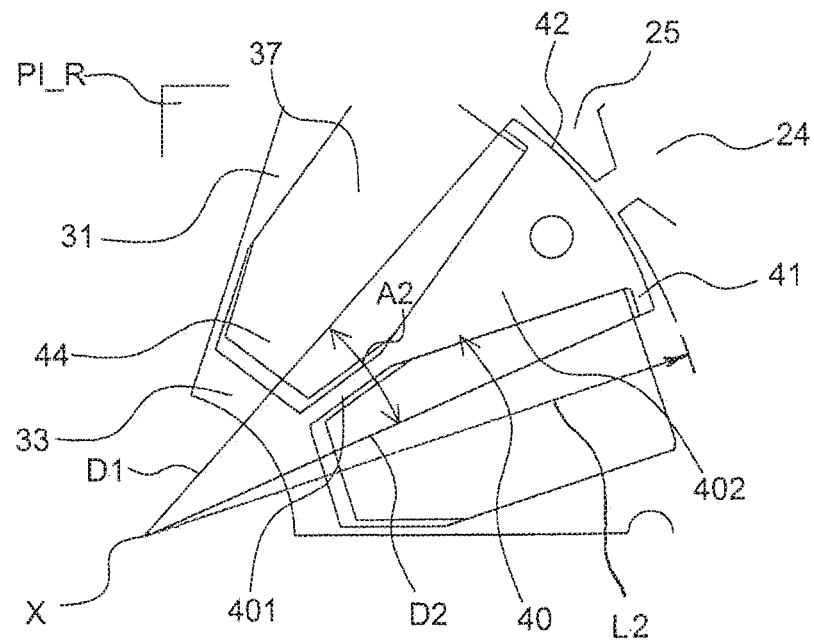
FIGS. 2a to 2c are partial views of the rotor illustrating the manner for carrying out certain measurements of angles and lengths involved in the calculation of the ratios according to the present invention.

FIG. 1 shows a rotary electrical machine 10 comprising a rotor 11 with an axis of rotation X, and designed to be fitted on a shaft 12. A wound stator 15, which can be polyphase, surrounds the rotor 11 with the presence of an air gap L1 between the outer periphery of the rotor 11 and the inner periphery of the stator 15 (cf. FIG. 2c). This stator 15 is secured on a housing which is configured to support the shaft 12 which is rotated via ball bearings and/or needle bearings.

More specifically, the stator 15 comprises a body 16 and a winding 17. The stator body 16 consists of an axial stack of flat plates. The body 16 comprises teeth 20 which are distributed angularly regularly on an inner periphery of a head 21. These teeth 20 delimit notches 24, such that each notch 24 is delimited by two successive teeth 20. The head 21 thus corresponds to the solid outer annular portion of the body 16, which extends between the base of the notches 24 and the outer periphery of the stator 15.

The notches 24 open axially into the axial end faces of the body 16. The notches 24 are also open radially towards the interior of the body 16.

The stator 15 is provided with tooth roots 25 on the free end side of the teeth 20. Each tooth root 25 extends circumferentially on both sides of a corresponding tooth 20. Each tooth root 25 extends circumferentially according to an arc of a circle centred on the axis of rotation X.

In order to obtain the winding 17, a plurality of phases are formed by coils 28 each wound around a tooth 20. Each coil 28 is formed from an electrically conductive wire covered with a layer of electrically insulating material such as enamel. According to one embodiment, a coil insulator can be interposed between each coil 28 and the corresponding tooth 20.

In addition, the rotor 11 comprises a body 31 formed by an axial stack of flat plates, in order to reduce the Foucault currents. The body 31 is made of ferromagnetic material. The body 31 can be connected in rotation to the shaft 12 of the rotary electrical machine in different ways, for example by forcing the ribbed shaft 12 inside the central opening 32 of the rotor provided in the core 33.

The rotor 11 comprises cavities 36 which are designed to receive permanent magnets 37 forming magnetic poles. Each cavity 36 passes through the body 31 from one axial end face to the other, and is open on the outer periphery side of the rotor 11. In this case, the cavities 36 are each delimited by two adjacent teeth 40 obtained from the central core 33 of the rotor. As a variant, the cavities 36 can be blind. In order to ensure radial retention of the magnets 37 in the cavities 36, the teeth 40 each comprise at their free end a retention lip 41 which extends circumferentially on both sides of the teeth 40.

Each magnet 37 has a parallelepiped form with two bevelled angles. The magnets 37 thus have a reduced cross-section at one of their ends, such that this end with the reference 44 has a trapezoidal form. The bevelled end of the magnets 37 is situated on the inner periphery side of the rotor 11, i.e. on the axis X side. As a variant, the bevelled end can be positioned on the opposite side, i.e. on the air gap L1 side.

In order for the cavities 36 to have a form complementary to the magnets 37, each rotor tooth 40 comprises a first portion 401 globally with a constant width, obtained from the core 33 extended by a second portion 402 which widens in the direction opposite the axis X, and ends in a retention lip 41. Each tooth 40 comprises an outer face 42, in this case corresponding to the outer face of the lip 41, situated opposite the inner periphery of the stator 15.

The magnets 37 are preferably made of ferrite. As a variant, they can however be made of rare earth, depending on the applications and the power required for the machine 10. As a variant, the magnets 37 can be of a different grade in order to reduce the costs. For example, in each cavity 36, a ferrite magnet 37 and a more powerful but more expensive rare earth magnet are associated. Certain cavities 36 could also be left empty according to the power required. The rotor 11 is of the flux concentration type, i.e. the lateral faces opposite the magnets 37 situated in two consecutive notches have the same polarity.

Preferably, the machine 10 has a number of notches per pole and per phase equal to 0.5.

Figure 2B:
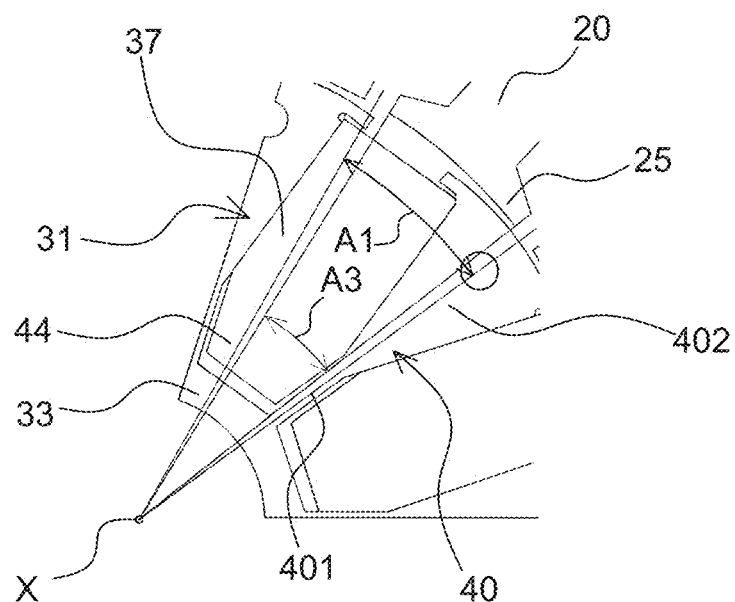
Figure 2C:
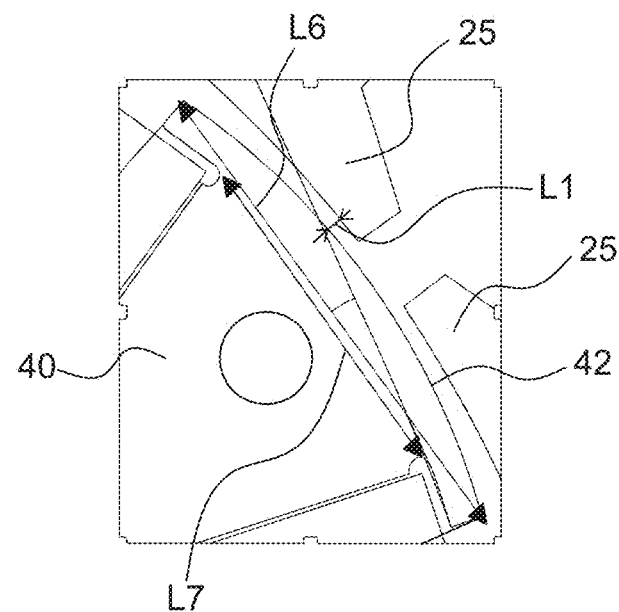
Figure 4:
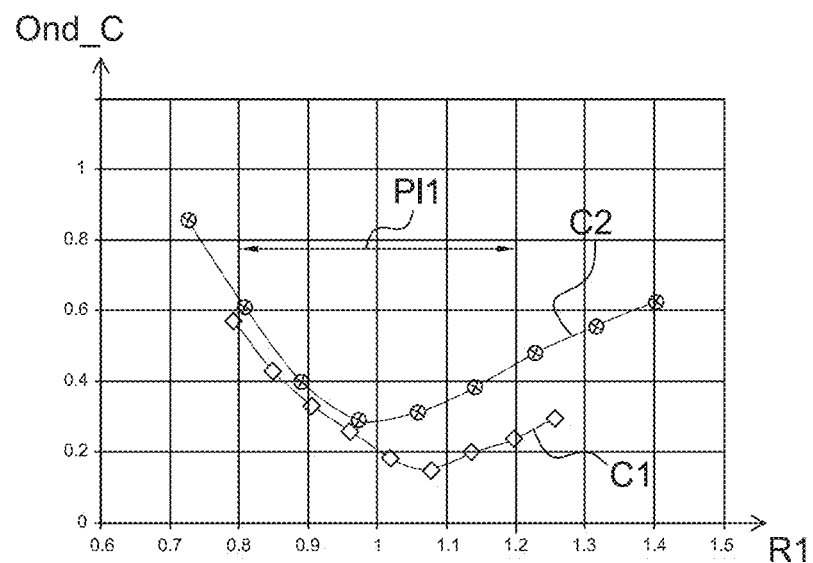
FIG. 4 shows graphic representations of the development of the level of undulation according to the first ratio in accordance with the present invention, respectively for two outer diameter values of the stator.

The stator tooth pitch A1 is defined as being equal to 360° divided by the number of stator teeth 20 (cf. FIG. 2b). In addition, on a plane PI_R which is radial relative to the axis X, a rotor tooth opening A2 of the rotor 11 is equal to the angle between two straight lines D1 and D2 which each pass via the axis of rotation X and an ortho-radial end of the outer face 42 of a corresponding tooth 40 (cf. FIG. 2a). As can be seen from the graph in FIG. 4, in order to minimise the torque undulation (Ond_C), the ratio R1 of the rotor tooth opening A2 expressed in degrees divided by the stator tooth pitch A1 expressed in degrees, i.e. R1=A2/A1, is situated in a range PI1 between 0.8 and 1.2. The torque undulation Ond_C is equal to the ratio of the allowance between the maximum and minimum torque divided by the average torque supplied by the machine 10. It should be noted that the curve C1 in FIG. 4 has been obtained for an outer diameter L8 of the stator equal to 104 mm, and the curve C2 has been obtained for an outer diameter L8 of the stator equal to 150 mm.

Figure 5:
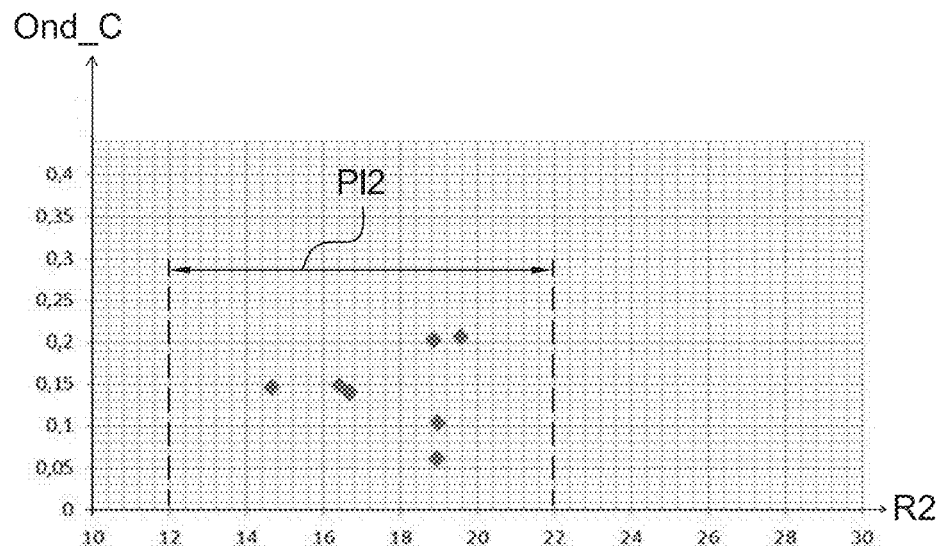
FIG. 5 is a graphic representation of values of levels of undulation obtained for different values of the second ratio according to the present invention.

In addition, a ratio R2 is defined equal to an inner diameter of the stator L2, expressed in mm, divided by a number of pairs of rotor poles p, i.e. R2=L2/p. As can be seen in FIG. 5, the preferential ratio R2 is situated in a range PI2 between 12 and 22, in particular between 13 and 21, for example between 14 and 20. It should be noted that the points on FIG. 5 have been obtained for an inner diameter of the stator of between 73 mm and 100 mm, and for a number of pairs of rotor poles equal to 5 or 6.

Figure 3:
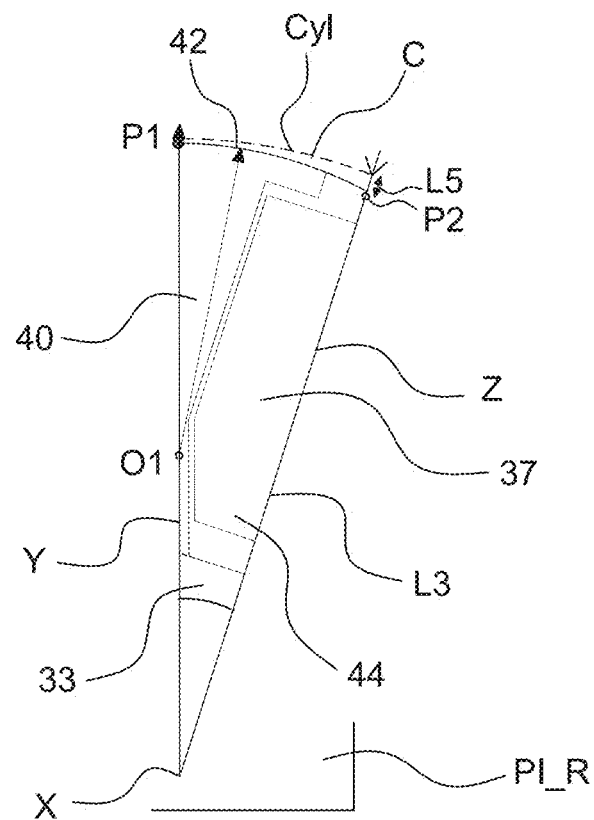
FIG. 3 is a partial view of the rotor illustrating the curvature in the form of an arc of a circle of a rotor tooth according to the present invention.

As illustrated in FIG. 3, the rotor 11 is contained in a cylinder of revolution Cyl with an outer radius L3. In addition, each rotor tooth 40 comprises an axis of symmetry Y which passes via the axis of rotation X of the rotor 11. On a plane PI_R which is radial relative to the axis X, corresponding to the plane of the sheet, the outer face 42 of each tooth 40 has a curvature in the form of an arc of a circle. Each rotor tooth 40 has two arcs of a circle which are symmetrical relative to the axis of symmetry Y.

Each arc of a circle is defined by a centre O1 situated on the axis of symmetry Y, a first point P1 situated at the intersection between the axis of symmetry Y and the circle C centred on the axis of rotation X, and the radius of which is the outer radius L3 of the cylinder Cyl, and a second point P2 situated on an axis Z which passes via the axis of rotation X. The axis Z forms a predetermined angle relative to the axis of symmetry Y. The predetermined angle is equal to 360° divided by a number equal to twice the number of poles. The predetermined angle can have a value equal to more or less 5% relative to the aforementioned value. The second point P2 is situated at a distance from the axis X equal to the outer radius L3 decreased by an allowance L5.

Figure 6:
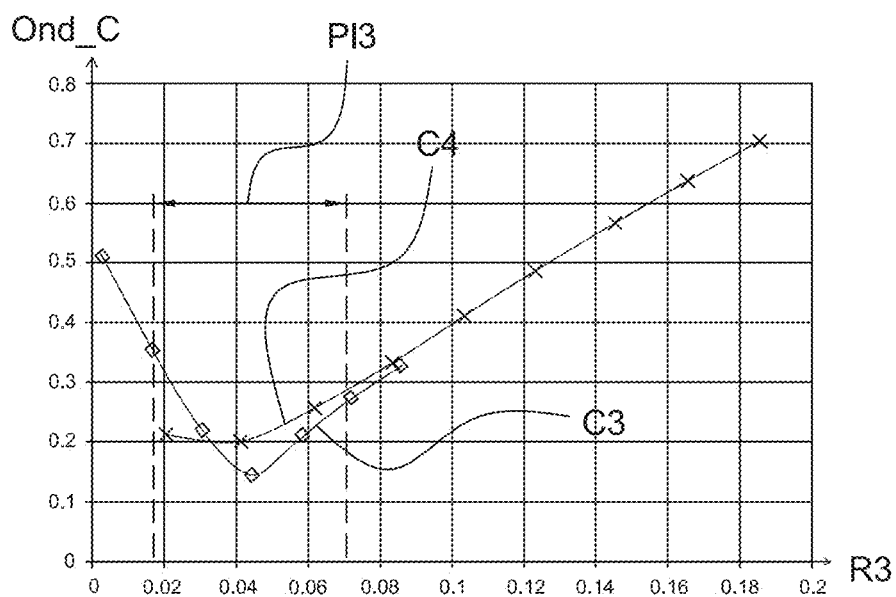
FIG. 6 is a graphic representation of the development of the level of undulation according to the third ratio in accordance with the present invention, respectively for two outer diameter values of the stator.

As can be seen from FIG. 6, the ratio R3 between the gap L5 and the outer radius L3 is situated in a range PI3 between 0.015 and 0.07. It should be noted that the curve C3 in FIG. 6 has been obtained for an outer diameter L8 of the stator equal to 104 mm, and the curve C4 has been obtained for an outer diameter L8 of the stator equal to 150 mm.

The preferential ranges of the different ratios R1, R2, R3 have an effect on the performance of the machine 10 independently from one another. However, it is noteworthy that an electrical machine with the three ratios will have optimum magnetic and mechanical performance.

According to one embodiment, the rotor tooth opening A2 is approximately 24°. The stator tooth opening A3 is approximately 20°. The number of pairs of poles p is equal to five.

The width at the top of a rotor pole corresponding to the ortho-radial dimension L6 measured between the ends of a lip 41 is approximately 14 mm. The width below the lip 41 corresponding to the ortho-radial dimension L7 measured is approximately 10 mm.

The gap L5 is approximately 1 mm. The air gap L1 is approximately 0.4 mm. The outer radius L3 of the cylinder of revolution in which the rotor 11 is contained is substantially equal to 34 mm.

The ratio R1 is approximately 1. The ratio R2 is approximately 13. The ratio R3 is approximately 3%.

In addition, the inner diameter L2 of the stator body 16 is between 60 mm and 115 mm. The inner diameter L2 can be 73 mm in a particular example. The outer diameter L8 of the stator body 16 is between 100 mm and 150 mm. The outer diameter L8 can be 104 mm in a particular example.

"Approximately" means values which can be situated in a range with a lower limit of the value indicated less 10% of this value, and with an upper limit of the value indicated plus 10% of this value.

It will be appreciated that the foregoing description has been provided purely by way of example, and does not limit the scope of the invention, a departure from which would not be constituted by replacement of the different elements by any other equivalents.

The invention claimed is:

1. A rotary electrical machine (10), comprising:
a stator (15) comprising a stator body (16) provided with a number of stator teeth (20) defining a plurality of notches (24), and a stator winding (17) inserted in the notches (24); and
a rotor (11) having an axis of rotation (X) and comprising a plurality of rotor teeth (40) defining cavities (36) in which permanent magnets (37) are disposed, the rotor (11) comprising a set of magnetic poles;
the rotor (11) is contained in a cylinder of revolution with an outer radius (L3), each rotor tooth (40) comprising:
an axis of symmetry (Y) passing through the axis of rotation (X) of the rotor; and
an outer face (42) opposite an inner periphery of the stator (15), on a plane (PI_R) radial relative to the axis of rotation (X);
the outer face (42) having a curvature in the form of an arc of a tooth circle, the arc of the tooth circle being defined by:
a center (O1) situated on the axis of symmetry (Y);
a first point (P1) situated at an intersection of the axis of symmetry (Y) and a circle centered on the axis of rotation (X), and a radius of which is the outer radius (L3); and
a second point (P2) situated on an axis (Z) passing through the axis of rotation (X) of the rotor, and forming an angle of 360° divided by a number equal to twice the number of magnetic poles relative to the axis of symmetry (Y);
the second point (P2) being situated at a distance from the axis of rotation (X) of the rotor which is equal to the outer radius (L3) decreased by an allowance (L5); and a ratio (R3) of the allowance (L5) to the outer radius (L3) is between 0.015 and 0.07.

2. The rotary electrical machine according to claim 1, wherein a number of notches per pole and per phase is equal to 0.5.

3. The rotary electrical machine according to claim 2, wherein:
- the stator (15) comprises a stator tooth pitch (A1) equal to 360° divided by a number of the stator teeth (20);
- on a plane (PI_R) radial relative to the axis of rotation (X) of the rotor, a rotor tooth opening (A2) is equal to an angle between two straight lines (D1, D2) each passing via the axis of rotation (X) of the rotor and an ortho-radial end of the outer face (42); and
- a ratio (R1) of the rotor tooth opening (A2) in degrees to the stator tooth pitch (A1) in degrees is between 0.8 and 1.2.

4. The rotary electrical machine according to claim 2, wherein a ratio (R2) of an inner diameter (L2) of the stator (15) expressed in mm to a number of pairs of rotor poles (p) is between 12 and 22.

5. The rotary electrical machine according to claim 1, wherein a ratio (R2) of an inner diameter (L2) of the stator (15) expressed in mm to a number of pairs of rotor poles (p) is between 12 and 22.

6. The rotary electrical machine according to claim 1, wherein the stator winding (17) is formed by a set of coils (28) each wound around one of the stator teeth (20).

7. The rotary electrical machine according to claim 1, wherein the rotor (11) is fitted on a shaft (12).

8. The rotary electrical machine according to claim 1, wherein the stator body (16) and the rotor (11) are each formed by a set of plates.

9. The rotary electrical machine according to claim 1, wherein a number of pairs of poles is equal to five.

10. The rotary electrical machine according to claim 1, wherein an inner diameter (L2) of the stator body (16) is between 60 mm and 115 mm.

11. The rotary electrical machine according to claim 1, wherein an outer diameter (L8) of the stator body is between 100 mm and 150 mm.

12. The rotary electrical machine according to claim 1, wherein the outer radius (L3) of the cylinder of revolution (Cyl) in which the rotor (11) is disposed is substantially equal to 34 mm.

13. The rotary electrical machine according to claim 1, wherein a rotor tooth opening (A2) is approximately 24°.

14. The rotary electrical machine according to claim 1, wherein a stator tooth opening (A3) is approximately 20°.

15. The rotary electrical machine according to claim 1, wherein each of the permanent magnets (37) has a beveled end (44) situated on a side of the axis of rotation (X).

16. The rotary electrical machine according to claim 1, wherein the rotor (11) is of a flux concentration type.

* * * * *